UNITED STATES PATENT OFFICE.

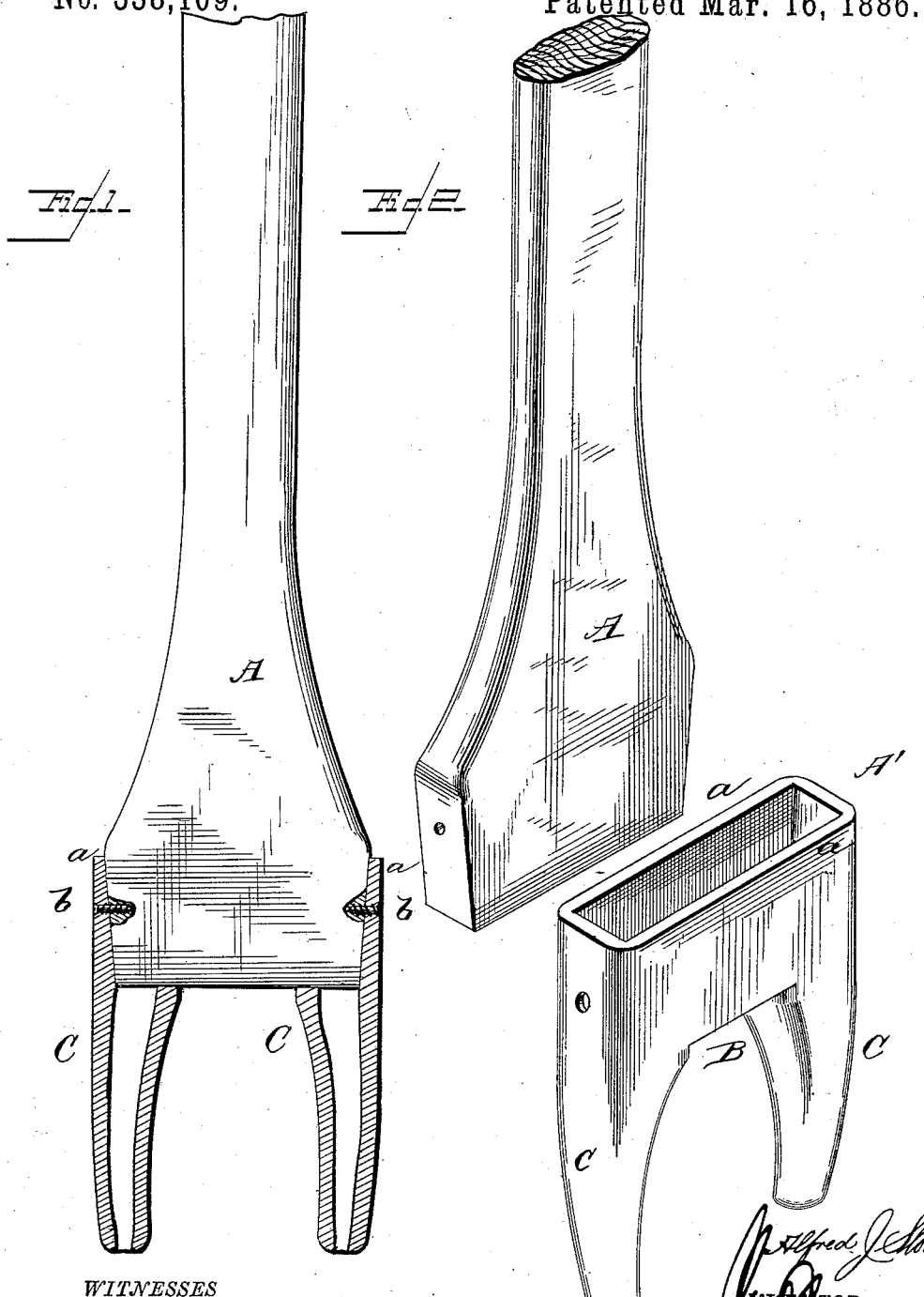

ALFRED J. SLOAN, OF CLYDE, NEW YORK.

CLOTHES-FORK.

SPECIFICATION forming part of Letters Patent No. 338,109, dated March 16, 1886.

Application filed June 4, 1885. Serial No. 167,656. (No model.)

*To all whom it may concern:*

Be it known that I, ALFRED J. SLOAN, a citizen of the United States of America, residing at Clyde, in the county of Wayne and State of New York, have invented certain new and useful Improvements in Clothes-Forks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in clothes-forks, the object of the same being to provide a cheap and effective implement for handling clothes in boilers, by the use of which the clothes may be stirred when in the boiler, and be readily taken therefrom by means of said implement without danger of the clothes falling from the fork or the person handling the same being scalded; and to this end my invention consists in a clothes-fork which is provided with a handle which is adapted to be attached to a metallic base provided with a socket, and prongs or forks which are curved inwardly, as will be hereinafter fully set forth, and specifically pointed out in the claim.

In the accompanying drawings, which illustrate my invention, Figure 1 is a sectional view of my implement, and Fig. 2 is a perspective view showing the parts of my improvement detached.

A represents a handle, said handle being enlarged and tapered at its lower portion, which is of the same configuration as the socket A', which is formed in the base B. The base B is preferably made of white metal, so that it will not rust and stain the clothes. The base is formed of side walls, *a a*, which are provided with perforations for the reception of screws *b*, which are used to attach the same to the handle. The lower portion of the socket A' is open, as shown in Fig. 1, and the lower portion of the handle rests upon the upper portion of the prongs C, which are formed integral with the base. These prongs are curved slightly inwardly.

When it is desired to lift the clothes from the wash-boiler, the fork is inserted in the same and turned, which movement will wrap the clothes around the prongs, so that they can be readily removed from the boiler and carried to another receptacle.

By the use of a fork of this construction the clothes will be held securely on the prongs while the handle is inclined upwardly, so that the water will not run upon the operator's hands.

The prongs C of the fork are hollow, as shown in Fig. 1, so as to render the casting lighter, and the upper ends of said prongs, which extend across the socket from one side of the wall to the other, form stops, upon which the lower end of the handle will rest.

I am aware that prior to my invention it has been suggested to provide a handle with a metallic fork having a shank which is secured to said handle, as shown in Patent No. 209,957, and I therefore make no broad claim to such invention; but

What I claim as new, and desire to secure by Letters Patent, is—

In combination with the handle A, having a tapered end, as shown, a metallic socket, B, with side walls, *a a*, and prongs C, extending therefrom, the upper portion of said prongs extending across the side walls, so as to form a stop for the end of the handle, and means for securing the socket to the handle, substantially as shown, and for the purpose set forth.

In testimony whereof I affix my signature in presence of two witnesses.

ALFRED J. SLOAN.

Witnesses:
JACOB GRANT,
RICHARD W. OLIVER.